(12) United States Patent
Bruhn

(10) Patent No.: US 12,091,170 B2
(45) Date of Patent: Sep. 17, 2024

(54) AUTONOMOUS SERVICING OF NETWORK DEVICES

(71) Applicant: DISH Network L.L.C., Englewood, CO (US)

(72) Inventor: Christopher William Bruhn, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 447 days.

(21) Appl. No.: 16/851,850

(22) Filed: Apr. 17, 2020

(65) Prior Publication Data

US 2021/0323664 A1   Oct. 21, 2021

(51) Int. Cl.
| | |
|---|---|
| *B64C 39/02* | (2023.01) |
| *B64U 101/00* | (2023.01) |
| *H04L 9/08* | (2006.01) |
| *H04L 9/14* | (2006.01) |
| *H04L 41/0668* | (2022.01) |

(52) U.S. Cl.
CPC .......... *B64C 39/024* (2013.01); *H04L 9/0877* (2013.01); *H04L 9/14* (2013.01); *B64U 2101/00* (2023.01); *H04L 41/0668* (2013.01)

(58) Field of Classification Search
CPC . H04L 41/0668; H04L 9/0825; H04L 9/0877; H04L 63/045; H04L 9/14; H04W 12/50; H04W 12/03; B64C 2201/12; B64C 39/024
USPC .......................................................... 701/3
See application file for complete search history.

(56) References Cited

U.S. PATENT DOCUMENTS

| | | | | |
|---|---|---|---|---|
| 9,094,816 | B2* | 7/2015 | Maier | H04W 4/70 |
| 10,592,843 | B2* | 3/2020 | Natarajan | G06Q 10/0832 |
| 10,621,543 | B2* | 4/2020 | Gupte | G06Q 10/0836 |
| 2015/0302669 | A1* | 10/2015 | Gonnsen | G01M 5/0075 |
| | | | | 701/23 |
| 2016/0191142 | A1* | 6/2016 | Boss | G06Q 30/0201 |
| | | | | 455/431 |
| 2016/0337027 | A1* | 11/2016 | Jalali | B64C 39/024 |
| 2016/0360562 | A1* | 12/2016 | Chong | H04W 4/024 |
| 2020/0207472 | A1* | 7/2020 | Scott-Nash | G06Q 10/06316 |

FOREIGN PATENT DOCUMENTS

| | | | | | |
|---|---|---|---|---|---|
| JP | | 2019518642 A | * | 6/2017 | B64C 39/02 |
| WO | WO-2018094554 A1 | | * | 5/2018 | G05D 1/101 |

* cited by examiner

*Primary Examiner* — Wing F Chan
*Assistant Examiner* — John Fan
(74) *Attorney, Agent, or Firm* — Kilpatrick Townsend & Stockton LLP

(57) ABSTRACT

Various arrangements for autonomous servicing of a network device are presented. A backend server system may receive status data from various devices. The backend server system may determine, based at least in part on the received status data, a triggering event associated with a first device. In response to the determined triggering event, location information associated with the first device may be sent to an unmanned aerial vehicle (UAV). The UAV may send security information directly to the first device. The first device may be required to validate the security device, then the UAV may modify a physical component of the first device.

17 Claims, 5 Drawing Sheets

AUTONOMOUS SERVICING OF NETWORK DEVICES

BACKGROUND OF THE INVENTION

Within Internet of Things (IoT)-based systems, many devices constantly communicate with each other. If one or more of the devices within the IoT-based system fails to properly operate, it may compromise the IoT-based system, as a whole. In addition, one or more devices within the IoT-based system may be placed in areas that are hard to access by a human being. Thus, there is a need to provide an autonomous device that is capable of servicing devices within an IoT-based system, especially those devices which are not easily accessible by humans.

BRIEF SUMMARY OF THE INVENTION

Various embodiments are described related to a method for autonomous servicing of a network device. In some embodiments, a method for autonomous servicing of a network device is described. The method may comprise receiving, by a backend server system from a plurality of devices, status data. The method may comprise determining, by the backend server system, based at least in part on the received status data, a triggering event associated with a first device of the plurality of devices. The method may comprise transmitting, by the backend server system, in response to the determined triggering event, location information associated with the first device of the one or more devices. The method may comprise transmitting, by the UAV directly to the first device, security information. The method may comprise, in response to the security information being validated by the first device of the one or more devices, accessing, by the UAV, a physical component associated with the first device. The method may comprise modifying, by the UAV, the physical component associated with the first device.

Embodiments of such a method may include one or more of the following features: validating, by the first device, the security information transmitted by the UAV. Validating may comprise using a private key to decrypt the security information transmitted by the UAV. The security information may be encrypted using a public key. The method may further comprise encrypting the security information using a public key. The method may further comprise scanning, by the first device, a matrix code affixed to the UAV. The method may further comprise determining, by the first device, that a secure connection may be established based on the matrix code. Accessing the physical component associated with the first device of the one or more devices may be further based on determining that the secure connection may be established based on the matrix code. The method may further comprise transmitting, by the UAV to the first device of the one or more devices, security information via a wired connection. The physical component associated with the first device of the one more devices may be selected from the group consisting of a battery, a sensor, a circuit board, and a light fixture. The physical component associated with the first device of the one more devices may be a memory set. Modifying the physical component may comprise removing the physical component and installing a replacement physical component.

In some embodiments, a system for autonomous servicing of a network device is described. The system may comprise a backend server system. The backend server system may be configured to receive status data from a plurality of devices. The backend server system may be configured to determine, based at least in part on the received status data, a triggering event associated with a first device of the plurality of devices. The backend server system may be configured to, in response to the triggering event, transmit location information associated with the first device of the plurality of devices to an unmanned aerial vehicle (UAV). The system may comprise the UAV. The UAV may comprise an aerial propulsion system. The system may comprise one or more processors configured to transmit, directly to the first device, security information. The one or more processors may be configured to, in response to the security information being validated by the first device of the one or more devices, access a physical component associated with the first device. The one or more processors may be configured to modify the physical component associated with the first device of the one or more devices.

Embodiments of such a method may include one or more of the following features: the system may further comprise the first device configured to validate the security information transmitted by the UAV. The first device may be further configured to perform validation using a private key to decrypt the security information transmitted by the UAV and the security information may be encrypted using a public key. The UAV may be further configured to encrypt the security information using a public key. The first device may be configured to scan a matrix code affixed to the UAV. The first device may be configured to determine that a secure connection may be established based on the matrix code. Accessing the physical component associated with the first device of the one or more devices by the UAV may be further based on determining that the secure connection may be established based on the matrix code. The UAV may be further configured to transfer, to the first device, the security information via a wired connection. The physical component associated with the first device of the one more devices may be selected from the group consisting of a battery, a sensor, a circuit board, and a light fixture. The physical component associated with the first device of the one more devices may be a memory set. The UAV may further comprise a trusted platform module (TPM) that generates encryption keys.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
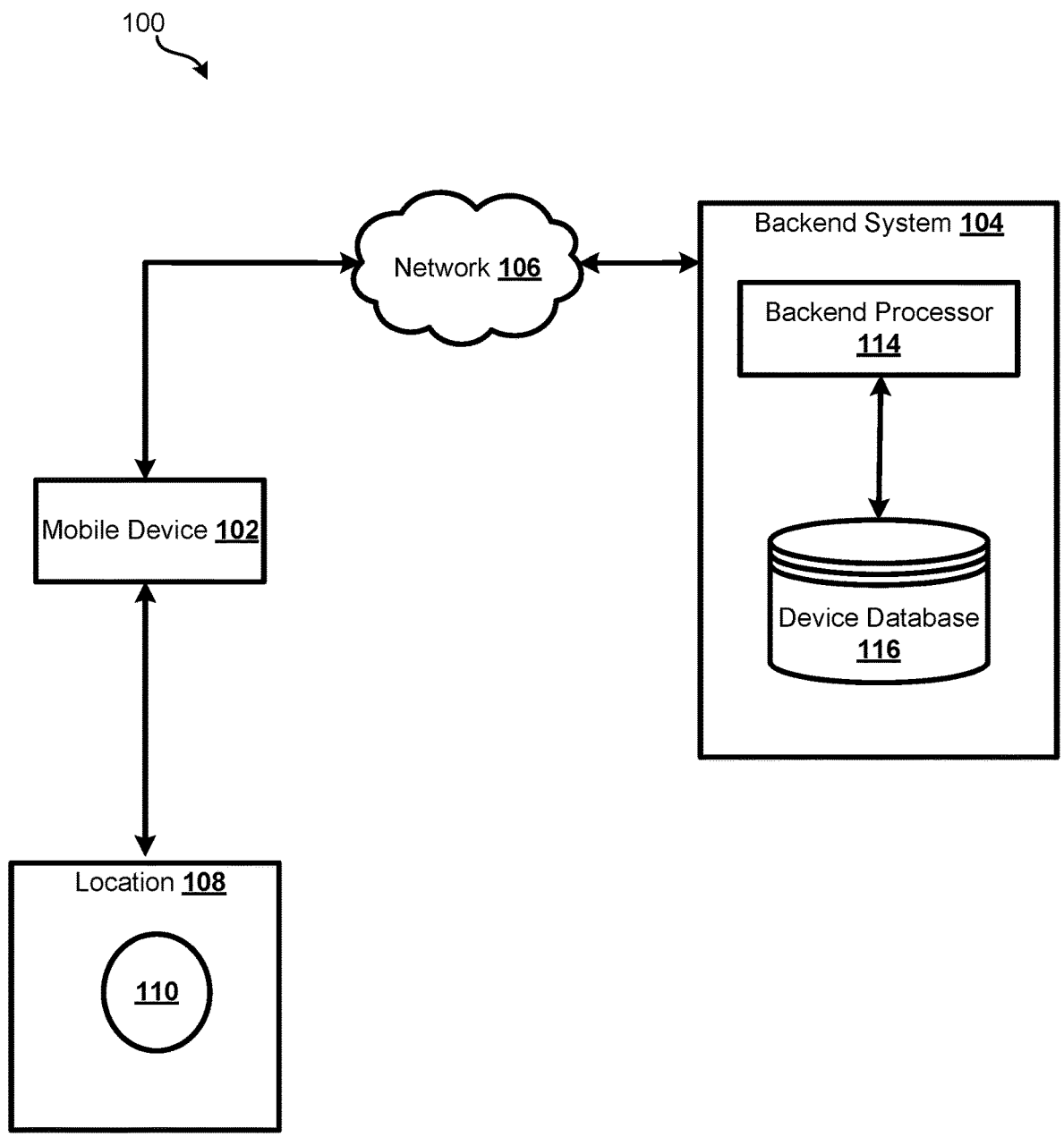
FIG. 1 illustrates an example of a network in accordance with one or more embodiments described herein.

Embodiments described herein generally relate to autonomous servicing of one or more devices. More specifically, embodiments described herein disclose techniques for an unmanned aerial vehicle (UAV) to be replace or modify one or more components of a device. A backend system may monitor one or more devices within a network. The backend system may receive status data indicating the status of one or more components of a device. For example, status data may indicate that a solar panel associated with a device has not be cleaned in 1 year. In one example, status data may indicate that the capacity of a battery associated with a device is below a certain threshold (which may indicate the battery has degraded).

In response to receiving status data, the backend system may determine that a triggering event has occurred. To determine a triggering event, the backend system may compare received status data to previously stored device data. For example, previously stored device data may indicate that a particular type of solar panel associated with a device may need to be cleaned once every 6 months. In such an example, status data may indicate that a device with that particular type of solar panel has not received a solar panel cleaning in over 6 months and a triggering event may be realized.

Once a triggering event has been determined by the backend system, a UAV may be deployed to a location associated with the device. The UAV may be retrofitted or may comprise one or more components that may be utilized to service a device. For example, the UAV may contain cleaning solution and a cleaning mechanism that may be utilized to clean a solar panel. In one example, the UAV may comprise one or more replacement components for a device, such as a battery, memory, and the like.

After the UAV arrives at the location associated with the device, the UAV and the device may establish a secure connection. The secure connection may be established by various means such as cryptography and other authentication/authorization means. For example, the UAV may transmit a cryptographic challenge, encrypted with a symmetric key. The device may then decrypt the cryptographic challenge with a symmetric key and send back a response to the UAV. If the UAV and the device have the same symmetric key then the response transmitted to UAV will correspond to the challenge transmitted to the device. Thus, authentication may be achieved. In one embodiment, the UAV may transmit a password to the device and if the password matches a stored password within the device, authorization may be achieved. Other means of establishing a secure connection may be realized.

While the secure connection between the UAV and the device exists, the UAV may perform a servicing sequence on the device. A servicing sequence may be determined based on the determined triggering event. For example, if the triggering event indicates that a battery of the device is degraded, then the servicing sequence may involve the UAV removing (via a robotic arm) the current battery, and inputting into the same location, a new battery. In one example, if the triggering event indicates that there is an insect nest being built on the device, then the servicing sequence may involve the UAV pushing air (via a propelling mechanism, air pressure mechanism, and the like) to forcefully destroy or remove the insect nest.

Techniques described herein are an improvement to device functionality. Many times, devices within a network, such as an NB-IoT network may be in locations that are hard to reach by a human. For example, a weather sensor within an NB-IoT network may be located under a bridge or atop of a bridge. In such an example, if a battery associated with the weather sensor has degraded, it may be impractical for a human to manually replace the battery associated with the weather sensor. Techniques described herein implement processes and systems for deploying a UAV to a location associated with the weather sensor. The UAV may then service the weather sensor by replacing the battery associated with the weather sensor (e.g., the battery internal to the weather sensor).

FIG. 1 illustrates an embodiment of a network system 100 according to one or more embodiments. System 100 comprises mobile device 102, backend system 104, network 106, and location 108. Mobile device 102 may be an unmanned aerial vehicle (UAV), such as a drone. Mobile device T may comprise one or more propellers (e.g., standard propellers, pusher propellers, and the like), one or more motors (e.g., brushless motor, brushed motor, and the like), landing gear, one or more electronic speed controllers (ESC), a flight controller, one or more renewable energy devices, one or more energy source interfaces, one or more transceivers, a GPS module, one or more batteries (or other energy sources), and/or one or more cameras. Mobile device 102 may be a fully autonomous UAV such that the UAV may autonomously fly to a particular location based on location information such as GPS coordinates.

Mobile device 102 may communicate with backend system 104 via network 106. Network 106 may be a 4G, 5G, or other broadband cellular network. In one embodiment, backend system 104 may transmit, via network 106, data to mobile device 102 that causes mobile device 102 to perform one or more functions described herein. For example, backend system 104 may transmit, via network 106, one or more GPS coordinates for device 110. As another example, backend system 104 may transmit, via network 106, one or more maintenance instructions to mobile device 102.

Backend system 104 comprises backend processor 114 and device database 116. Backend system 104 may provide data packets to mobile device 102 and, in some embodiments, determine locations associated with device 110. Backend processor 114 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Device database 116 may comprise one or more non-transitory processor-readable mediums, such as random access memory (RAM), flash memory, a hard drive disk (HDD), or a solid state drive (SSD). Device database 116 may store data associated with device 110 and other devices. For example, device database 116 may store a current location indicator associated with device 110, a battery charge threshold associated with device 110, component identifiers identifying one or more components of device 110 (e.g., solar panel, battery, memory), prior maintenance data associated with device 110 (e.g., what maintenance services were previously performed), security information associated with device 110 (e.g., passwords and/or encryption/decryption keys), and the like.

Location 108 may be a geographic location where device 110 is physically located. Location 108 may be locations associated with a particular type of network such as a sensor-based network. Device 110 may be connected to other devices via a network such as a Low Power Wide Area Network (LPWAN), a Low Power Wireless Personal Area Network (LPPAN), Long Term Evolution (LTE) Cat NB1 Network, LTE Cat NB2 Network, and the like. Devices 110 may be a sensor (e.g., gas, water, pollution, noise, weather sensor), controller (e.g., light and heat controller), security monitors (e.g., device capable of tracking a person, animal or asset), and the like.

Figure 2:
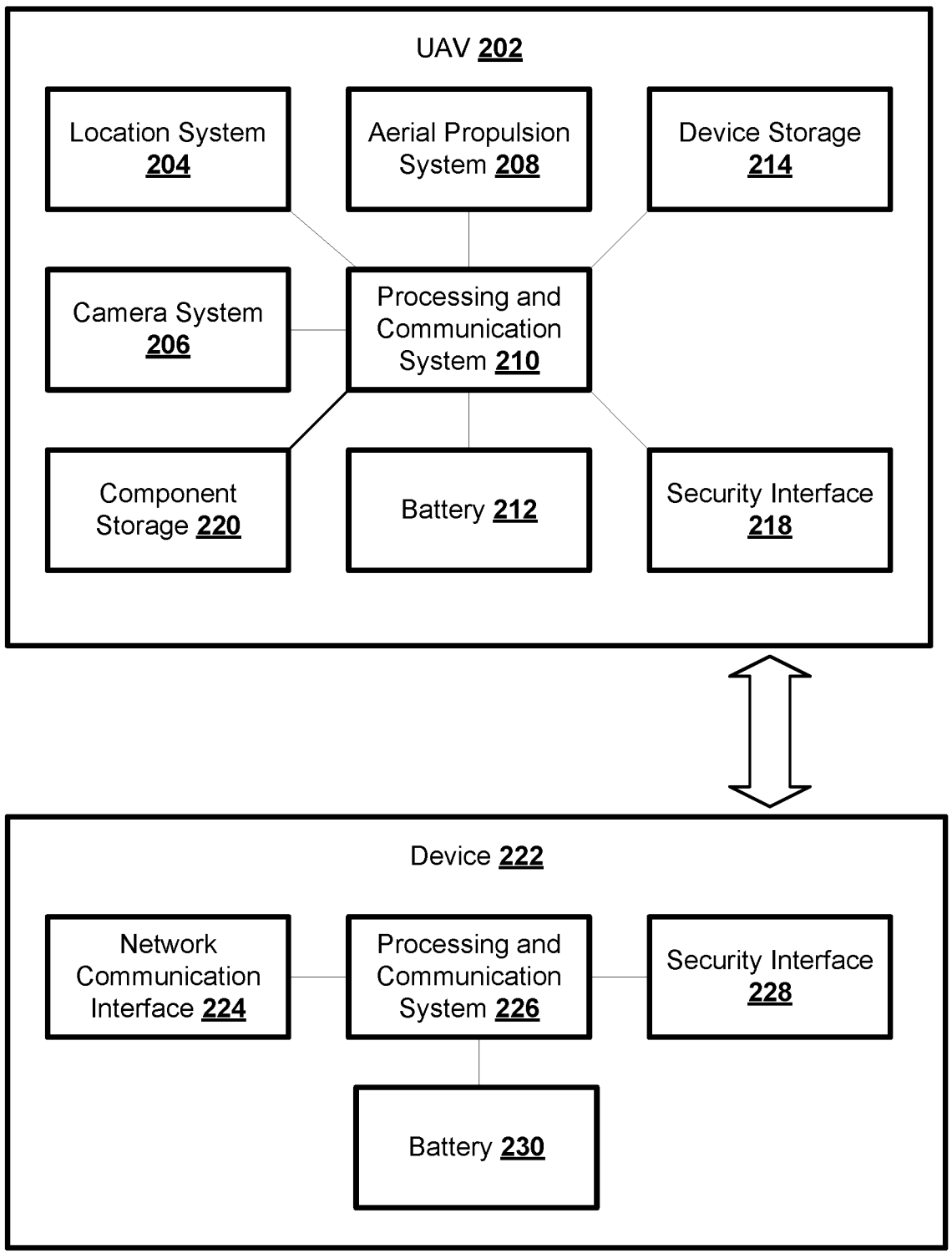
FIG. 2 illustrates an example of a UAV and a device in accordance with one or more embodiments described herein.

FIG. 2 illustrates an embodiment of block diagrams for UAV 202 and device 222. UAV 202 comprises location system 204, camera system 206, aerial propulsion system 208, processing and communication system 210, battery 212, device storage 214, security interface 218, and component storage 220. UAV 202 may represent mobile device 102 as depicted in FIG. 1. Location system 204 may include a GPS system that may communicate with one or more satellites (or other networks) to provide location information associated with UAV 202. Location information may be utilized by UAV to determine proximity to device 222. For example, UAV 202 may need to be within a certain physical range of device 222 in order to replace battery 230 of device 222 and/or implement one or more security protocols.

Camera system 206 may include one or more cameras. For example, camera system 206 may include a digital single-lens reflex camera (DSLR), an infrared camera, a depth camera, and the like. These various camera types may be utilized to capture information about device 222. For example, a DSLR camera may be used to take a picture of a solar panel associated with device 222 to determine, via image recognition, any potential damage to the solar panel. In another example, an infrared camera may be utilized to determine if battery 230 has overheated and cannot maintain a charge.

Aerial propulsion system 208 may include devices that aid UAV 202 in flight. Aerial propulsion system 208 may include propellers (e.g., standard propellers, pusher propellers, and the like), one or more motors (e.g., brushless motor, brushed motor, and the like), landing gear, one or more electronic speed controllers (ESC), a flight controller, one or more transceivers, and the like.

Processing and communication system 210 may include one or more processors and one or more communication interfaces. The one or more processors may perform, via executing code stored in memory, one or more functions described herein. The one or more communication interfaces may be utilized to perform one or more maintenance services on device 222. The one or more communication interfaces may also be utilized to communicate via a broadband cellular network with a backend system to receive data associated with device 222, such as a security information associated with device 222.

Battery 212 may provide power to one or more components of UAV 202. For example, battery 212 may provide power to one or more components of aerial propulsion system 208 in order to propel UAV 202. Battery 212 may be a rechargeable battery, non-rechargeable battery, a capacitor, a super capacitor, or other energy source.

Device storage 214 may store data associated with device 222. Device storage 214 may store data that has been previously received by UAV 202. Data associated with component storage 220 may include, location information associated with device 222, a security key associated with device 222, a password associated with device 222, system faults, maintenance to be performed and the like.

Security interface 218 may be a device capable establishing a secure connection between UAV 202 and device 222. For example, security interface 218 may be a trusted platform module (TPM) or other trusted piece of hardware capable of generating one or more keys for communication between UAV 202 and device 222. In such an example, a seed value associated with device 222 may be stored in device storage 214. This seed value may be utilized by security interface 218 to create an encryption key or password that may be confirmed or authenticated by security interface 228 of device 222. In one embodiment, security interface 218 may store, within secure/encrypted memory, one or more passwords to be transmitted to device 222. In such an embodiment device storage 214 may store data in a less secure or unencrypted manner. In one embodiment, security interface 218 may comprise of a physical wire that is capable of physically connecting (e.g., via a magnetic interface) to device 222. The physical connection may then be used to exchange passwords or other data. By using a physical connection, wireless hacking attempts may be thwarted.

Component storage 220 may store one or more components that may be utilized by UAV 202 to perform one or more maintenance services. For example, component storage 220 may contain a replacement battery for device 222. In one example, component storage 220 may contain cleaning solution and a cleaning mechanism that may be utilized to clean a solar panel associated with device 222. In one embodiment, component storage 220 may contain a memory device (e.g., a read-only memory) that has pre stored firmware (or other software). In such an embodiment, UAV 202 may update a software component of device 222 by exchanging memory within device 222 with memory in component storage 220. Further, component storage 220 may store one or more replacement sensors and may be used to replace a sensor as part of a maintenance procedure.

Device 222 comprises network communication interface 224, processing and communication system 226, security interface 228, and battery 230. Network communication interface 224 may be a system-on-a-chip (SoC) or other hardware device that enables communication between one or more devices. Network communication interface 224 may enable device 222 to communicate with one or more devices within the same network according to a first protocol. For example, network communication interface 224 may allow device 222 to communicate with other devices over a broadband cellular network, satellite network, LPWAN or LPPAN.

Processing and communication system 226 may include one or more processors and one or more communication interfaces. The one or more processors may perform, via executing code stored in memory, one or more functions described herein. The one or more communication interfaces may be utilized to communicate via a wired or wireless connection to UAV 202 via one or more protocols such as, but not limited to, Bluetooth, WiFi, Near Field Communication (NFC), and the like. The one or more communication interfaces may also be utilized to communicate via a broadband cellular network with other devices in a network (e.g., other sensors in a sensor network) to receive and transmit data associated with device 222, such as IoT data.

Security interface 228 may be a device capable establishing a secure connection between UAV 202 and device 222. For example, security interface 228 may be a trusted platform module (TPM) or other trusted piece of hardware capable of generating one or more keys for communication between UAV 202 and device 222. For example, security interface 228 may consist of a Universal Serial Bus (USB) interface. In such an embodiment, security interface 218 may comprise a USB cable capable of connecting to the USB interface of security interface 228. In one embodiment, security interface 228 is a physical enclosure that covers one or more components of device 222. In such an embodiment, security interface 228 may have to be unlocked in order for UAV 202 to have physical access to one or more components of device 222. For example, security interface 228 may be an enclosure over battery 230, that must be opened in order for UAV 202 to have physical access to battery 230. Security interface 228 may be unlocked by various security means, such as receiving a particular password, receiving communications encrypted with a certain key, and the like. In one embodiment, security interface 228 may comprise a scanning mechanism capable of scanning one or more parts of UAV 202 in order to unlock security interface 228. For example, security interface 228 may comprise a QR code scanner, barcode scanner, camera, or the like that is capable of imaging or scanning one or more parts of UAV 202 in order to unlock a compartment such that UAV 202 will have physical access to one or more components of device 222.

Battery 230 may provide power to one or more components of device 222. For example, battery 230 may provide power to processing and communication system 226 in order to communicate with other devices within a network. Battery 230 may be rechargeable battery, non-rechargeable battery, a capacitor, a super capacitor, or other energy source.

Figure 3:
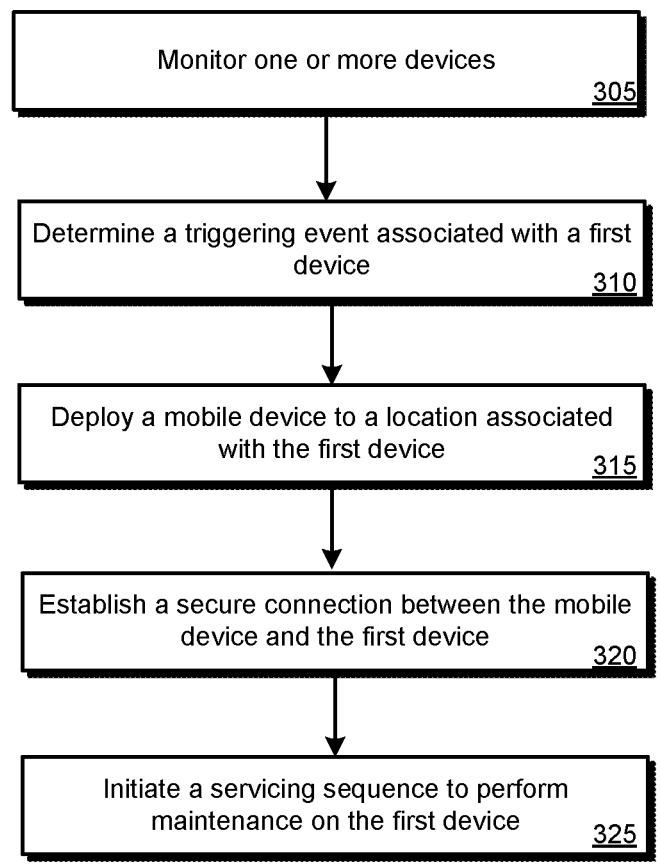
FIG. 3 depicts a first method in accordance with one or more embodiments described herein.

FIG. 3 illustrates an example process 300 in accordance with one or more embodiments described herein. Process 300 may be performed by one or more components of system 100. For example, one or more operations of process 300 may be performed by backend system 104 and/or mobile device 102 of FIG. 1. Process 300 may be a process for initiating a servicing sequence on a device.

At 305, a backend system monitors one or more devices. The one or more devices may be a part of one or more networks. For example, the one or more devices may be a plurality of sensors that are part of an NB-IoT network. In another example, the one or more devices may be one or more sensors connected to a satellite network. In one embodiment, the one or more devices may communicate with the backend system via a cellular broadband communication system such as 3G, 4G, and/or 5G. In one embodiment, the backend system receives periodic updates associated with the one or more devices. The periodic updates may include status data. For example, status data may indicate that a solar panel associated with a device has not be cleaned in 1 year. In one example, status data may indicate that the capacity of a battery associated with a device is below a certain threshold (which may indicate the battery has degraded). Status data may indicate that bandwidth (to or from) associated with a device is within a certain range. A periodic update may also include weather conditions associated with a device. The weather conditions may indicate if there is, for example, heavy rainfall, overcast conditions, strong winds, and the like. Such information may be useful to the backend system to determine if or when a mobile device may be capable of being deployed to a device's location. The status data may also include diagnostic information associated with a device. Diagnostic information may be the result of a self-diagnosis test run by the device. Diagnostic information may indicate an uplink and downlink bandwidth associated with the device, storage capacity (i.e., memory capacity) associated with the device, a current firmware or software version running on the device, system faults, sensor issues, operation issues and the like.

At 310, the backend system determines a triggering event has occurred associated with a first device. The first device is one of the one or more devices that are being monitored. The triggering event may indicate one or more items of attention associated with the first device. The triggering event may be a battery maximum capacity associated with the first device falling below a certain threshold (e.g., 10%, 15%, 20% of the original battery capacity and the like), lack of maintenance within a certain time period (e.g., a solar panel has not been cleaned within 6 months), bandwidth dropping below a certain threshold, a firmware associated with the first device being outdated, a system fault, a sensor issue, an operation issue and the like. The triggering event may be determined based on device specific information. For example, a solar panel associated with the first device may need to be cleaned every 6 months, while a solar panel associated with a second device may need to be cleaned every 12 months. In such an example, a triggering event may be specific to the first device but not to the second device.

At 315, the backend system deploys a mobile device to a location associated with the first device. The mobile device may be an unmanned autonomous vehicle or other type of autonomous vehicle. The backend system may have stored, within a device database, GPS coordinates associated with the first device. The backend system may deploy the mobile device by transmitting to the mobile device GPS coordinates. In one embodiment, the backend system may also transmit to the mobile device, first device information, such as one or more security protocols that may be utilized to authenticate or access one or more parts of the first device and the like. In one embodiment, the mobile device may be stationed at the backend system and deployed from the backend system. In one embodiment, the mobile device may comprise one or more components specific to the first device. For example, mobile device may contain a specific memory set that is to be incorporated into the first device. Regardless of where the mobile device is stationed, the backend system may communicate with the mobile device via a cellular broadband connection.

At 320, the mobile device establishes a secure connection between the mobile device and the first device. The secure connection may be established by a variety of ways. For example, the mobile device may transmit to the first device a password and if the password is a valid password, then the first device may transmit an access granted response to the mobile device. The transmission may be direct (e.g., via Bluetooth or some other low-power direct wireless communication) or indirect, such as via a wireless network hosted by an access point. In one embodiment, both the mobile device and the first device may comprise secure hardware such as a TPM. The TPMs of the mobile device and the first device may be physically connected to each other via a wired connection (such as a USB connection). The TPMs of both the mobile device and first device may mutually authenticate each other based on shared keys (e.g., public/private keys) between the TPMs. In one embodiment, one or more components of the mobile device may be scanned by the first device. For example, mobile device may have a matrix code (e.g. QR code or some other form of machine-readable code that can be scanned) affixed to it. In such an example, the QR code may be scanned by scanner associated with the first device. The scanned QR code is then compared to previously authorized QR codes to determine if a secure connection is to be established between the mobile device and the first device. Regardless of the means in which the secure connection is established, the first device, by some means, determines if the mobile device is in fact authorized to access one or more components of the first device.

In some embodiments, both of the mobile device and the first device may have some form of matrix code or machine-readable code affixed. Each device may scan or otherwise read the code of the other device and validate the code before proceeding. Validation of the code may include transmitting the code to a remote server for validation or performing the validation locally by comparing the code to a database of authorized codes. In some embodiments, such a validations of matrix or machine-readable codes may be performed before encryption keys are exchanged.

At 325, the mobile device initiates a servicing sequence to perform maintenance on the first device. The servicing sequence may be based upon the determined triggering event at 310. For example, if the triggering event indicates that a solar panel associated with the first device has not been cleaned within a requisite time, then the servicing sequence may include spraying the solar panel with a solution and then removing the cleaning solution with a cleaning mechanism such as a squeegee. In one embodiment, if the triggering event indicates that the firmware of the first device is out of date, then the servicing sequence may include replacing memory of the first device with a memory device that contains updated firmware. As a result of process 300, one or more devices may be autonomously serviced by a mobile device based upon a triggering event.

Figure 4:
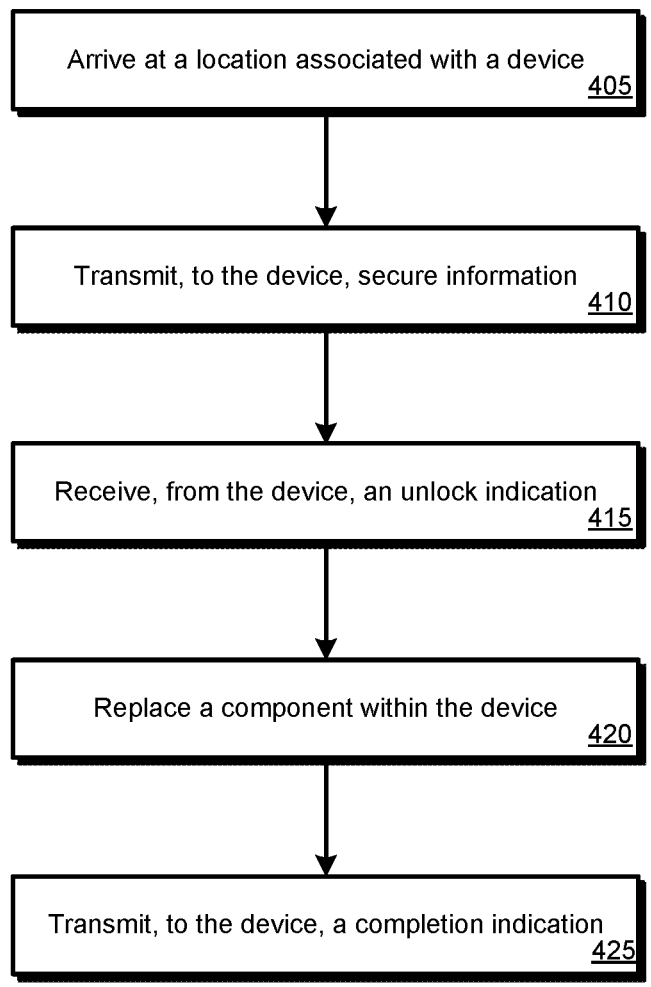
FIG. 4 depicts a second method in accordance with one or more embodiments described herein.
Figure 5:
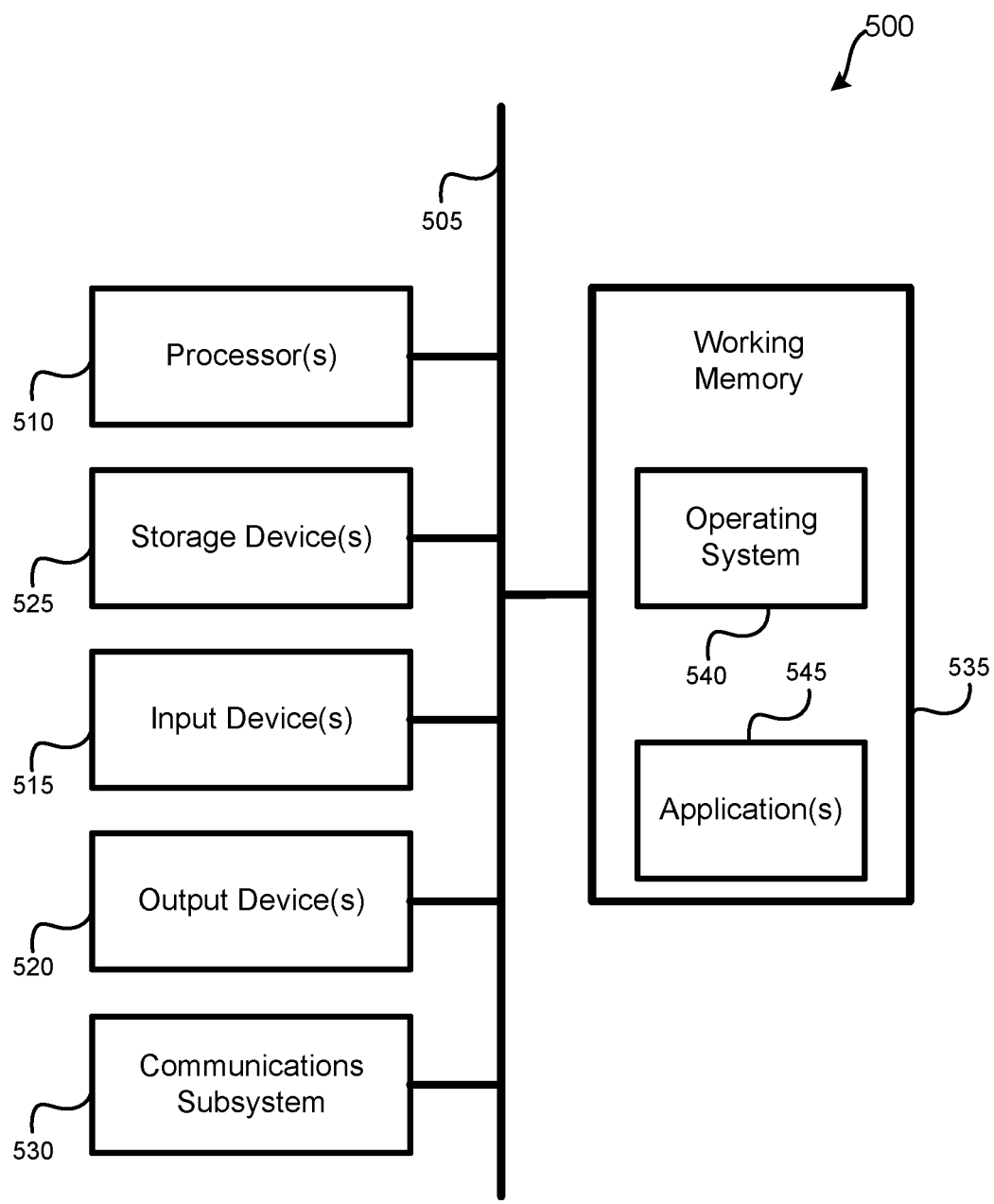
FIG. 5 illustrates an example computer system in accordance with one or more embodiments described herein.

FIG. 4 illustrates an embodiment of process 400. Process 400 may be performed by one or more components of system 100. For example, one or more operations of process 400 may be performed by mobile device 102 and/or backend system 104 of FIG. 1. Process 400 may be a process for establishing a secure connection between a mobile device and a device.

At block 405, a mobile device arrives at a location associated with a device. The device may be part of a network, such as a NB-IoT network. The location associated with the device may be within a certain proximity of the device. In one example, the device may be located in a hard to reach area such as under a bridge or on the side of a building. In such an example, the mobile device may hover within a certain proximity (e.g., 5 feet, 3 feet, etc.) of the device such that the mobile device may perform one or more maintenance operations. In one embodiment, the mobile device may dock at a location within a certain proximity to the device. Such an embodiment, may be particularly useful when a physical connection may be needed to establish the secure connection.

At block 410, the mobile device transmits security information to the device. Security information may be an alphanumeric password, a cryptographically produced message, a hardware identifier (e.g., TPM identifier), and the like. A cryptographically produced message may comprise a message encrypted with a shared key, such that only another party with the same shared key may properly decrypt the message. A cryptographically produced message may comprise a message encrypted with a private key of the mobile device, such that only the public key of the mobile device may be utilized to properly decrypt the message. The device may utilize the public key of the mobile device to determine (via decryption) that the mobile device is in fact a particular mobile device and not an imposter device. In such an embodiment, the device may have stored in memory a plurality of authorized mobile devices.

In some embodiments, the backend system may communicate with the device to provide an indication of a mobile device to expect. For example, the backend system could tell the device that it is sending it mobile device having a particular identifier. The backend system could also provide information to the device that includes a temporary password to use for the next interaction between the device and the mobile device.

In one embodiment, the security information may be transmitted via a wired or wireless communication means. For example, the security information may be transmitted via Bluetooth, WiFi, 4G, 5G, Near Field Communication (NFC), and the like. In another example, the security information may be transmitted via a wired connection such as by USB, SATA, high speed serial bus, and the like. In one embodiment, a wired connection may be utilized to increase the security of transmission of data as it may prevent a man in the middle attack from occurring.

At block 415 assuming the transmitted secure information corresponds to previously stored secure information, the mobile device receives, from the device, an unlock indication. The unlock indication may indicate that the mobile device has been successfully authorized to access one or more components of the device. In one embodiment, the unlock indication may also indicate that a portion of the device has been physically unlocked. In such an embodiment, one or more components of the device (e.g., battery, memory, etc.) may be protected by a locked compartment. This locked compartment may be unlocked upon the mobile device presenting proper security information.

At block 420, the mobile device replaces a component within the device. To replace a component the mobile device may attach to a mechanism holding the particular component. For example, there may be a mechanism holding a battery of the device to which the mobile device may magnetically connect to. Once connected to a mechanism holding a particular component the mobile device may, via, for example, a magnetic arm, remove the component and then place a substitute component its place. For example, the mobile device may remove, via a robotic claw, memory from the device, and replace the removed memory with new memory. The new memory may have different software stored. Such an embodiment may be useful to upgrade or modify one or more components of the device. In one embodiment, instead of replacing a component within the device, one or more components within the device may be serviced. For example, a particular component may be cleaned with pressurized air (or other cleaning mechanism).

At block 425, subsequent to the replacement of a component within the device, the mobile device transmits a completion indication to the device. The completion indication may indicate to the device that the replacement has been completed. The device may then relock a previously unlocked compartment to protect one or more components of the device.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for autonomous servicing of a network device, comprising:
   receiving, by a backend server system from a plurality of devices, status data;
   determining, by the backend server system, based at least in part on the received status data, a triggering event associated with a first device of the plurality of devices;
   transmitting, by the backend server system, in response to the determined triggering event, location information associated with the first device of the one or more devices to an unmanned aerial vehicle (UAV);
   scanning, by the first device, a matrix code affixed to the UAV; and
   determining, by the first device, that a secure connection is to be established based on the matrix code:
   transmitting, by the UAV directly to the first device, security information comprising a key obtained from a trusted platform module (TPM) of the UAV;
   in response to the security information being validated by the first device of the one or more devices, receiving, by the UAV from the first device, an unlock indication indicating that a physical component of the first device has been physically unlocked;
   after receiving the unlock indication, accessing, by the UAV, the physical component associated with the first device;
   removing, by the UAV from the first device, the physical component; and
   installing, by the UAV in the first device, a replacement physical component that replaced the physical component.

2. The method of claim 1, further comprising: validating, by the first device, the security information transmitted by the UAV.

3. The method of claim 2, wherein validating comprises using a private key to decrypt the security information transmitted by the UAV, wherein the security information is encrypted using a public key.

4. The method of claim 1, further comprising: encrypting the security information using a public key.

5. The method of claim 1, wherein accessing the physical component associated with the first device of the one or more devices is further based on determining that the secure connection is to be established based on the matrix code.

6. The method of claim 1, further comprising:
   transmitting, by the UAV to the first device of the one or more devices, security information via a wired connection.

7. The method of claim 1, wherein the physical component associated with the first device of the one more devices is selected from the group consisting of: a battery; a sensor; a circuit board; and a light fixture.

8. The method of claim 1, wherein the physical component associated with the first device of the one more devices is a memory set.

9. A system for autonomous servicing of a network device, comprising:
   a backend server system, comprising one or more processors, configured to:
      receive status data from a plurality of devices;
      determine, based at least in part on the received status data, a triggering event associated with a first device of the plurality of devices; and
      in response to the triggering event, transmit location information associated with the first device of the plurality of devices to an unmanned aerial vehicle (UAV);
   the first device, configured to:
      scan a matrix code affixed to the UAV; and
      determine that a secure connection is to be established based on the matrix code; and
   the UAV, comprising:
      an aerial propulsion system, and
      one or more processors, configured to:
   transmit, directly to the first device, security information, comprising a key obtained from a trusted platform module (TPM) of the UAV;
      in response to the security information being validated by the first device of the plurality of devices, receive, from the first device, an unlock indication indicating that a physical component of the first device has been physically unlocked;
      after receiving the unlock indication, access the physical component associated with the first device;
      remove, from the first device, the physical component; and
      install, in the first device, a replacement physical component that replaces the physical component.

10. The system of claim 9, further comprising the first device configured to validate the security information transmitted by the UAV.

11. The system of claim 10, wherein the first device is further configured to perform validation using a private key to decrypt the security information transmitted by the UAV and the security information is encrypted using a public key.

12. The system of claim 9, wherein the UAV is further configured to encrypt the security information using a public key.

13. The system of claim 9, wherein accessing the physical component associated with the first device of the one or more devices by the UAV is further based on determining that the secure connection is to be established based on the matrix code.

14. The system of claim 9, wherein the UAV is further configured to transfer, to the first device, the security information via a wired connection.

15. The system of claim 9, wherein the physical component associated with the first device of the one more devices is selected from the group consisting of: a battery; a sensor; a circuit board; and a light fixture.

16. The system of claim 9, wherein the physical component associated with the first device of the one more devices is a memory set.

17. The system of claim 9, wherein the UAV further comprises the TPM.

* * * * *

UNITED STATES PATENT AND TRADEMARK OFFICE
CERTIFICATE OF CORRECTION

PATENT NO. : 12,091,170 B2
APPLICATION NO. : 16/851850
DATED : September 17, 2024
INVENTOR(S) : Christopher William Bruhn Page 1 of 1

It is certified that error appears in the above-identified patent and that said Letters Patent is hereby corrected as shown below:

In the Claims

In Claim 1, Column 11, Line 54, please delete "one or more" and insert -- plurality of --

In Claim 1, Column 12, Line 7, please delete "replaced" and insert -- replaces --

In Claim 7, Column 12, Line 28, please delete "one more" and insert -- one or more --

In Claim 8, Column 12, Line 32, please delete "one more" and insert -- one or more --

In Claim 15, Column 13, Line 20, please delete "one more" and insert -- one or more --

In Claim 16, Column 13, Line 24, please delete "one more" and insert -- one or more --

Signed and Sealed this
Twenty-second Day of October, 2024

Katherine Kelly Vidal
*Director of the United States Patent and Trademark Office*